US006643295B1

(12) United States Patent
Nose

(10) Patent No.: US 6,643,295 B1
(45) Date of Patent: Nov. 4, 2003

(54) DATA COMMUNICATION SYSTEM AND METHOD WITH IMPROVED SYSTEM EFFICIENCY

(75) Inventor: Natsuki Nose, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/306,989

(22) Filed: May 7, 1999

(30) Foreign Application Priority Data

May 8, 1998 (JP) .......................................... 10-125969

(51) Int. Cl.[7] .............................................. H04B 7/212
(52) U.S. Cl. ........................................ 370/442; 370/508
(58) Field of Search ................................. 370/508, 519, 370/356, 442, 443, 229, 230, 231, 235, 395.1, 395.21, 509, 503; 375/356, 358; 348/9, 10.3

(56) References Cited

U.S. PATENT DOCUMENTS

| 5,889,765 | A | * | 3/1999 | Gibbs .......................... 370/294 |
| 6,031,846 | A | * | 2/2000 | Gurusami et al. ........... 370/508 |
| 6,262,997 | B1 | * | 7/2001 | Quayle ........................ 370/503 |
| 2001/0038647 | A1 | * | 11/2001 | Bernath et al. ............. 370/503 |

OTHER PUBLICATIONS

"Data–Over–Cable Service Interface Specifications, Radio Frequency Interface Specification SP–RFI–I02–971008" Cable Television Laboratories, Inc.; pp. i–vii, 8–9 and 84–87, Oct. 8, 1997.

* cited by examiner

*Primary Examiner*—Douglas Olms
*Assistant Examiner*—Brian Nguyen
(74) *Attorney, Agent, or Firm*—Finnegan, Henderson, Farabow, Garrett & Dunner, L.L.P.

(57) ABSTRACT

An efficient data communications system is disclosed. In one embodiment, a data communications system includes a central control unit; a plurality of terminals; and a communication channel having an upstream channel and a downstream channel, the communication channel connecting the central control unit and the terminals, the upstream channel being time-shared among the terminals and a time shared channel being assigned to a terminal that requests a time-shared channel. The central control unit further comprises means for measuring a transmission delay between the central control unit and each terminal via the communication channel; means for selecting the maximum transmission delay from the measured transmission delays; and means for controlling the timing of data transmission of the central control unit according to the maximum transmission delay.

17 Claims, 7 Drawing Sheets

FIG. 5

| MINI-SLOT | TERMINAL ID | PACKET CLASS |
|---|---|---|
| 1~4 | BROADCAST | REQUEST |
| 5~10 | X | DATA |
| 10~15 | Y | DATA |
| ... | ... | ... |

FIG. 6

| PREAMBLE | HEADER | TERMINAL ID | NUMBER OF REQUESTING MINI-SLOTS |

FIG. 7

| MINI-SLOT | TERMINAL ID | PACKET CLASS |
|---|---|---|
| 1~4 | BROADCAST | REQUEST |
| 5~7 | A | DATA |
| 8~12 | B | DATA |
| ... | ... | ... |

FIG. 8

| PREAMBLE | HEADER | TERMINAL ID | DATA FIELD |

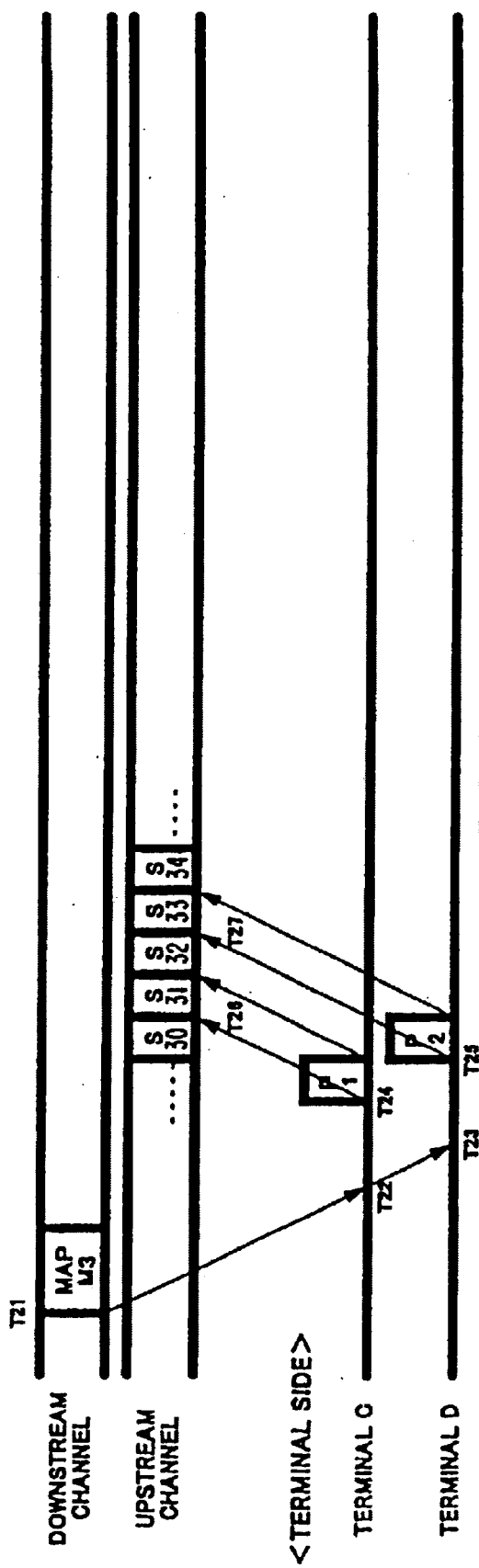

DATA COMMUNICATION SYSTEM AND METHOD WITH IMPROVED SYSTEM EFFICIENCY

FIELD OF THE INVENTION

This invention relates to data communications systems, and, more particularly, to a system and method for improving the system efficiency of a data communication system. An upstream communication channel connecting a central control unit and a plurality of terminals is time-shared with the terminals by controlling the timing of every terminal's data transmission according to the operation states of the terminals in the system.

BACKGROUND OF THE INVENTION

An interactive data communication system using an existing cable television (CATV) network has recently provided fast communication services for members. The data communication system primarily comprises a central control unit and a plurality of members terminals, communicating with each other using a space frequency band on the CATV network organized with hybrid fiber coaxial (HFC) cables.

The data communication system has a communication channel consisting of a set of opposite channels, namely, a downstream channel and an upstream channel. A packet, which controls the timing of each terminal's data transmission (hereinafter, referred to as a "MAP")is carried via the downstream channel from the central control unit to each terminal. On the other hand, a packet, which requests transmission of data (hereinafter, referred to as a "request packet"), and a packet which includes data itself (hereinafter, referred to as "data packet") are carried via the upstream channel in the opposite direction. The upstream channel is time-shared among the terminals. A minimum unit of the time-divided upstream channel is called a "mini-slot". The central control unit controls assignments of mini-slots on the upstream channel through the MAP.

The central control unit broadcasts a MAP informing every terminal which mini-slots accept request packets. A terminal which desires to transmit data to the central control unit sends a request packet for the indicated, available mini-slot. After collecting these request packets for a predetermined period of time (hereinafter, referred to as "latency"), the central control unit assigns a desired number of mini-slots for transmission of the data to each corresponding terminal and broadcasts a subsequent MAP informing each terminal of the assignment of the mini-slots. Finally, each corresponding terminal transmits the data to the central control unit according to the assignment.

A theoretical distance between the central control unit and a terminal causes a transmission delay which comprises (1) a downstream propagation delay to allow the terminal to receive a MAP, (2) a processing time of the terminal to allow the terminal to parse and respond to the MAP, and (3) an upstream propagation delay to allow the central control unit to receive a data packet. Therefore, the central control unit examines every terminal's transmission delay and reserves the maximum transmission delay caused by the most theoretically distant terminal. And the central control unit decides the proper latency in consideration of the maximum transmission delay.

However, all terminals are not always in operation in the data communications system. Consequently, the system may waste time. Furthermore, when a new terminal is added to the system or an existing terminal is removed from the system, the predetermined latency may be improper.

SUMMARY OF THE INVENTION

Accordingly, it is an object of the present invention to provide a system and method for improving system efficiency of the data communications system. The method may thus control the timing of every terminal's data transmission according to the operation state of the terminals in the systems.

A data communications system, consistent with the present invention, comprises a central control unit, a plurality of terminals, and a communication channel connecting the central control unit and the terminals. The communication channel includes upstream and downstream channels. The upstream channel is time-shared with the terminals and each of the time-shared channels is assigned to one of the terminals requesting one of the time-shared channel by the central control unit. The central control unit includes a measuring means, a determining means, and a controlling means. The measuring means measures the transmission delay between the central control unit and each of the terminals via the communication channel. The determining means determines the maximum transmission delay out of the transmission delays. The controlling means controls the timing of the data transmission in the system on the basis of the maximum transmission delay.

BRIEF DESCRIPTION OF THE DRAWINGS

A more complete appreciation of the present invention and many of the attendant advantages thereof will be readily obtained as the same becomes better understood by reference to the following detailed description, when considered in connection with the accompanying drawings, wherein;

FIG. 5 shows an example of a frame structure of a mini-slot allocation field of the MAP of FIG. 4;

FIG. 6 shows an example of a frame structure of a request packet used in a data communications system according to the present invention;

FIG. 7 shows an example of a frame structure of a mini-slot allocation field of a MAP of FIG. 4;

FIG. 8 shows an example of a frame structure of a data packet used in a data communications system according to the present invention;

FIG. 11 is a timing chart illustrating a procedure for data transmission between a central control unit and terminals in the data communications system according to the present invention;

FIG. 12 shows an example of a frame structure of a mini slot allocation field of the MAP of FIG. 4;

DETAILED DESCRIPTION OF THE INVENTION

Figure 1:
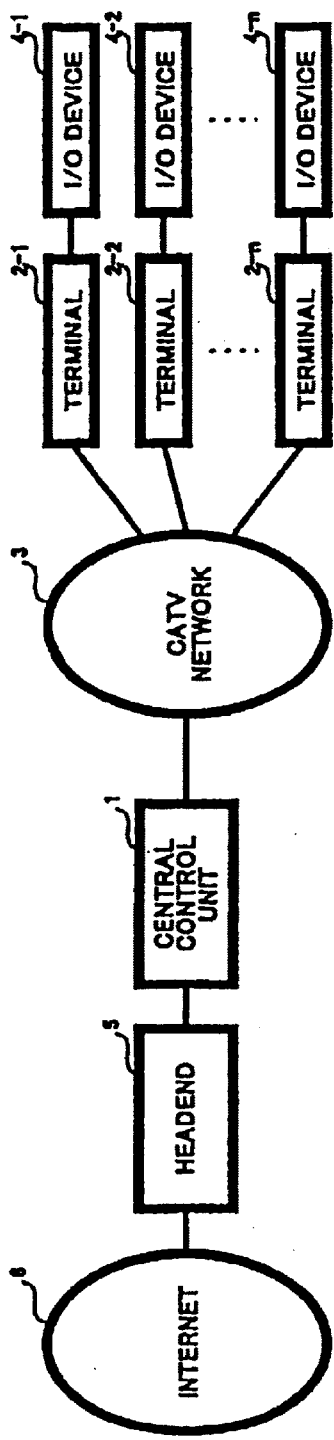
FIG. 1 is a block diagram illustrating an example of a main configuration of a data communications system according to the present invention.

In FIG. 1, the data communications system comprises a central control unit 1, a plurality of terminals 2-1~2-n, and a CATV network 3 connecting the central control unit 1 and the terminals 2-1~2-n. Each of the terminals 2-1~2-n connects with one of a plurality of I/O devices 4-1~4-n such as a personal computer. The central control unit 1 can access the Internet 6 via a headend 5 which is an interface device such as a router.

The CATV network 3, which is made of HFC cables, forms a tree structure in which the central control unit 1 is at the top and the terminals 2-1~2-n are at the bottom. Data transmitted by one of the terminals 2-1~2-n is finally carried toward the central control unit 1 via a single data communication channel. So, after a request from one of the terminals 2-1~2-n, the central control unit 1 instructs the corresponding terminal when to transmit data conformably to the time-division multiplex procedures.

FIGS. 2, 3, 4, 5, 6, 7, and 8 illustrate an example of data transmission in a data communications system according to the present invention.

Figure 2:
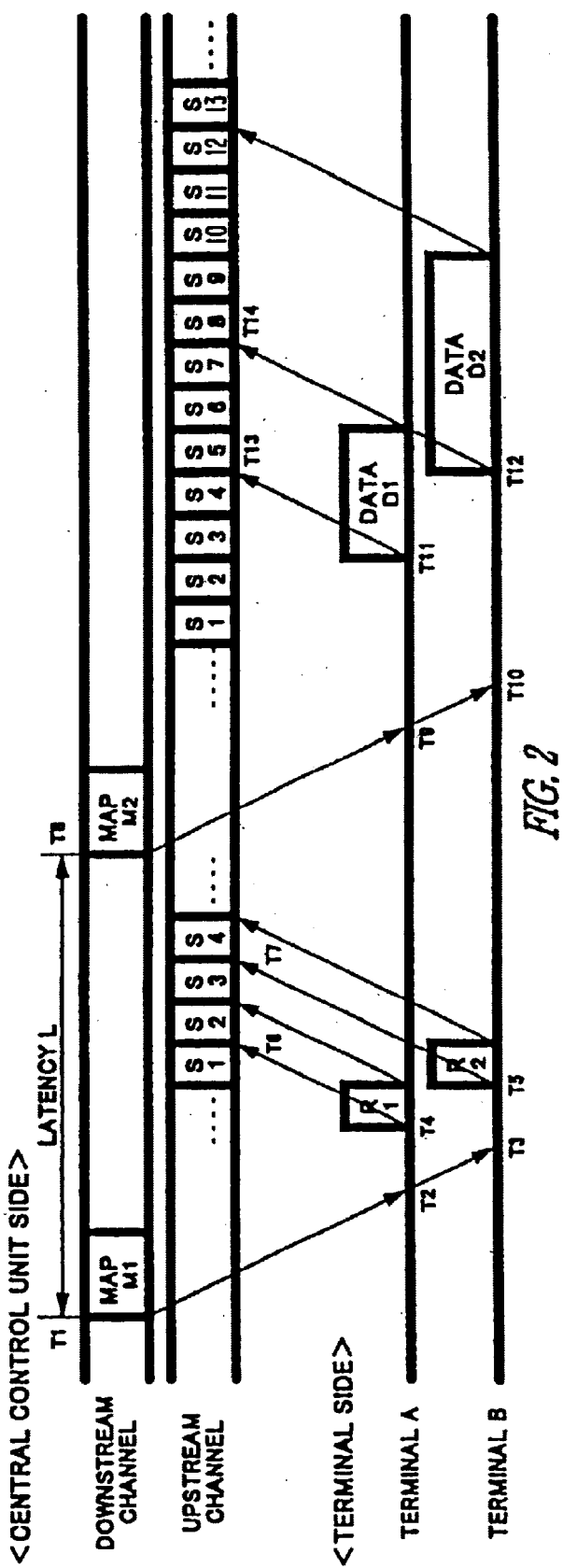
FIG. 2 is a timing chart illustrating a procedure for data transmission between a central control unit and terminals in a conventional data communications system.
Figure 3:
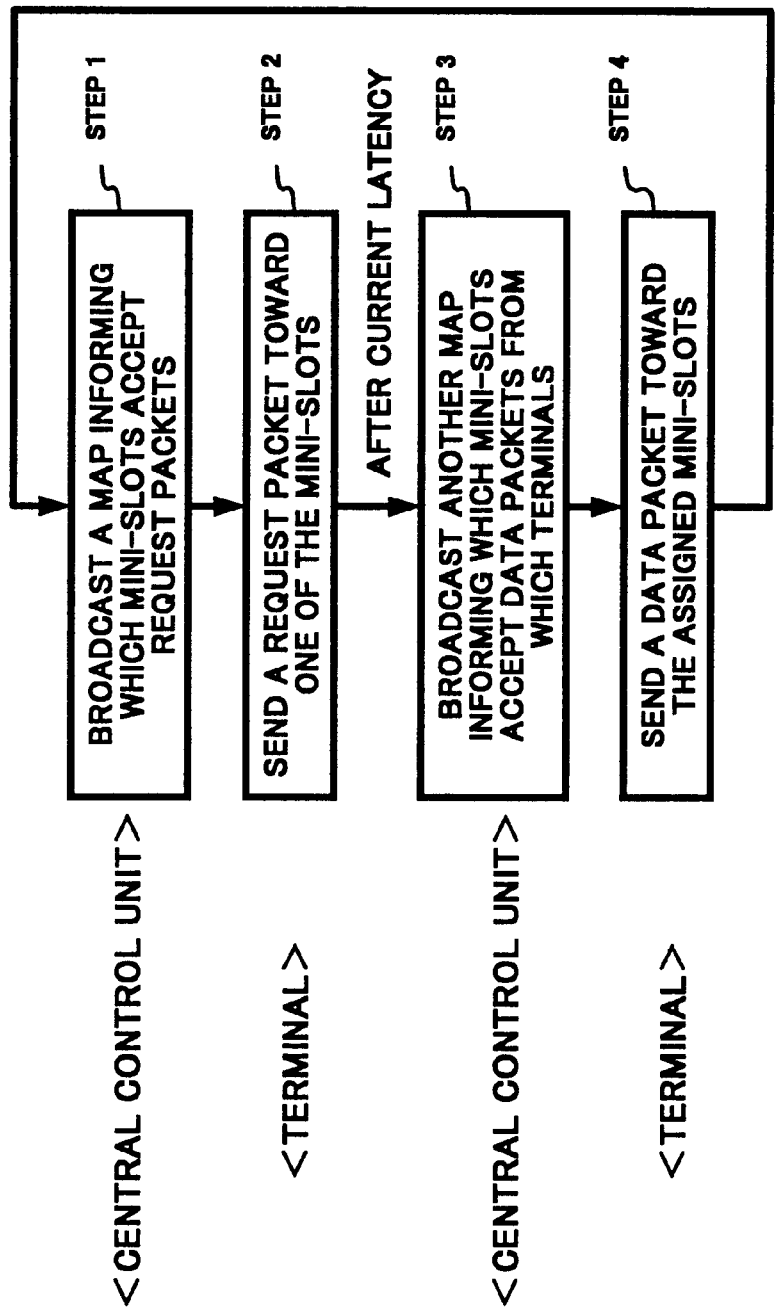
FIG. 3 is a flowchart illustrating a procedure for data transmission between a central control unit and terminals in a data communications system according to the present invention.

In FIG. 2, at time T1, the central control unit 1 broadcasts every terminal 2-1~2-n a MAP M1 identifying which mini-slots accept request packets (see STEP 1 of FIG. 3).

Figure 4:
FIG. 4 shows an example of a frame structure of a MAP used in a data communications system according to the present invention.

As shown in FIG. 4, the MAP Ml comprises three parts: a preamble composed of unique words for identifying the MAP M1, a header informing the terminals 2-1~2-n of a packet class of the MAP M1, and a mini-slot allocation field (described later).

At time T2, the terminal A receives the MAP M1 and scans it for request opportunities. Similarly, at time T3, the terminal B receives the MAP M1 and scans it for request opportunities. The mini-slot allocation field of the MAP M1 informs both terminals of request opportunities so that every terminal 2-1~2-n can transmit a request packet toward mini-slots S1, S2, S3, and S4, as shown in FIG. 5.

At time T4, the terminal A sends a request packet R1 for as many mini-slots as needed to accommodate data packet D1 toward a mini-slot S2 (see STEP 2 of FIG. 3). Time T4 is chosen based on a ranging offset indigenous to the terminal A so that the request packet R1 will arrive at the central control unit 1 at T6. Similarly, at time T5, the terminal B sends a request packet R1 for as many mini-slots as needed to accommodate data packet D2 toward the slot S4 (see STEP 2 of FIG. 3). Time T5 is chosen based on a ranging offset indigenous to the terminal B so that the request packet R1 will arrive at the central control unit at T7.

As shown in FIG. 6, a request packet comprises four parts: a preamble composed of unique words for identifying the request packet, a header informing the central control unit 1 of the packet class of the request packet, a terminal ID informing the central control unit 1 of the sender of the request packet, and a number of mini-slots desired by the corresponding terminal.

At time T8, after a latency L from T1, the central control unit 1 broadcasts every terminal 2-1~2-n subsequent MAP M2 identifying which mini-slots accept data packets from which terminals (see STEP 3 of FIG. 3). The mini-slot allocation field of the MAP M2 informs both terminals of data transmission opportunities so that the terminal A can transmit data packets toward mini-slots S5, S6, and S7 and the terminal B can transmit data packets toward mini-slots S8, S9, S10, S11, and S12, as shown in FIG. 7.

At time T9, the terminal A receives the MAP M2 and scans it for data transmission opportunities. Similarly, at time T10, the terminal B receives the MAP M2 and scans it for data transmission opportunities. Consequently, both terminals recognize the assignment of the mini-slots.

As shown in FIG. 8, a data packet comprises four parts: a preamble composed of unique words for identifying the data packet, a header informing the central control unit 1 of the packet class of the data packet, a terminal ID informing the central control unit 1 of the transmitter of the data packet, and the data field itself. At time T11, the terminal A sends a data packet D1 toward mini-slots S5, S6, and S7 (see STEP 4 of FIG. 3). Time T10 is chosen based on a ranging offset indigenous to the terminal A so that the data packet D1 will arrive at the central control unit at T13. Similarly, at time T12, the terminal B sends a data packet D2 toward mini-slots S8, S9, S10, S11, and S12 (see STEP 4 of FIG. 3). Time T10 is chosen based on a ranging offset indigenous to the terminal B so that the data packet D1 will E2-arrive at the central control unit at T14.

Figure 9:
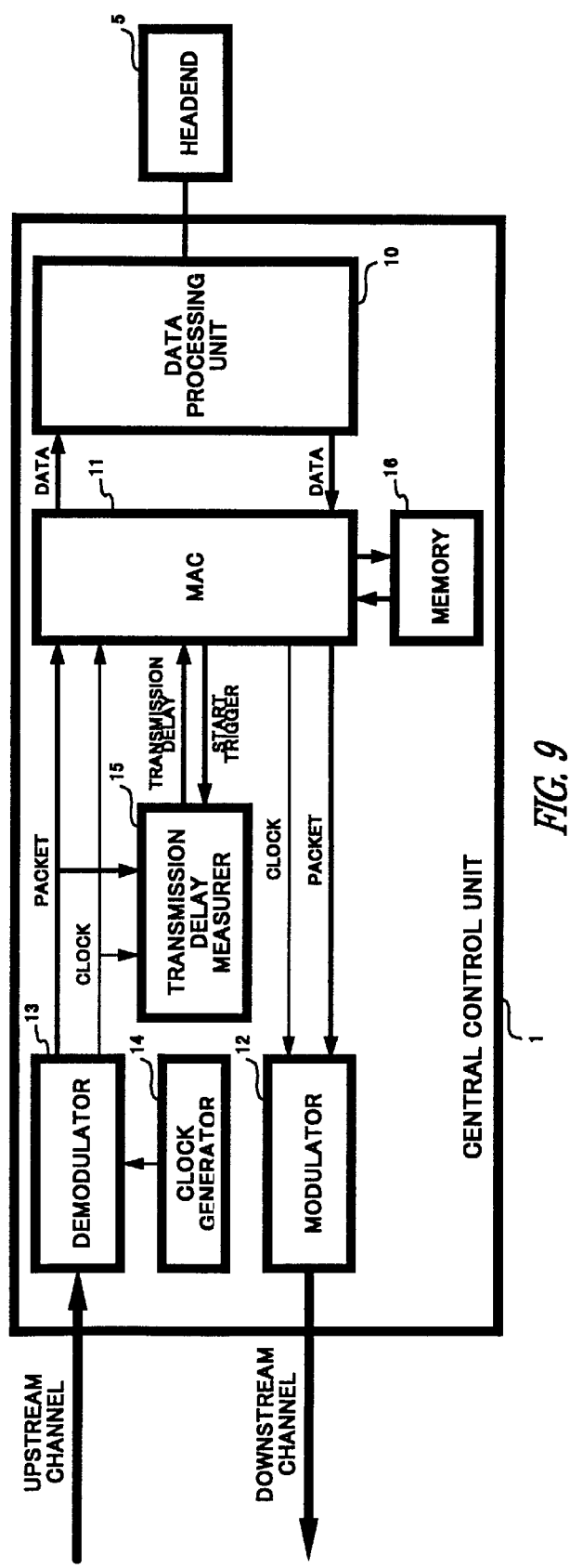
FIG. 9 is a block diagram illustrating an example of the central control unit of FIG. 1.

FIG. 9 is a block diagram illustrating an example of the central control unit of FIG. 1.

In FIG. 9, the central control unit 1 comprises a data processing unit 10, a media access controller (MAC) 11, a modulator 12, a demodulator 13, a clock generator 14, and a transmission delay measurer 15. Then the central control unit 1 dynamically updates the latency L.

The data processing unit 10, which connects to the headend 5, processes data forwarded from the MAC 11 in accordance with a predetermined specification of the system and forwards the processed data to the MAC 11. The MAC 11 manages every packet transmission between the central control unit 1 and each terminal 2-1~2-n in the system. On receiving the data from the data processing unit 10, the MAC 11 commands the transmission delay measurer 15 to start a timer which is put inside of the transmission delay measure 15, and also sets the data into a frame of a predetermined packet, such as a MAP, and forwards the packet to the modulator 12. The MAC 11 also manages the maximum transmission delay of the system using a memory 16. The modulator 12 modulates the packet and transmit the data via the downstream channel.

The demodulator 13 demodulates signals received via the upstream channel and forwards the received packet to both the MAC 11 and the transmission delay measure 15. The MAC 11 forwards only the data set in the packet to the data processing unit 10. The transmission delay measurer 15 measures every transmission delay between the central control unit 1 and a terminal in operation. The transmission delay measurer 15 calculates a time required to make a round trip, namely, a transmission delay using the timer and forwards the transmission delay to the MAC 11.

The clock generator 14 generates a clock for setting the standard time in the system. The clock signal is then provided for predetermined components.

FIGS. 10, 11, 12, and 13 illustrate an example of an initial-ranging operation in the data communications system. Whenever the system is switched on or reset, the central control unit 1 adjusts an output level of all the terminals 2-1~2-n, measures every transmission delay in the prescribed way, and also adjusts timing of data transmission in the system.

The data processing unit 10 forwards data for initial-ranging to be transmitted downstream through a MAP M3 at predetermined intervals. On receiving the data, the MAC 11 sets the data into a frame of the MAP M3 and outputs the MAP M3 to the modulator 13. At time 21, after modulating, the modulator 13 transmits the modulated MAP M3 downstream.

The MAP M3 may have the same structure of a frame as shown in FIG. 4, in which the data for initial-ranging is inputted together with data in some other packet class, and also may. have a special structure of a frame for the data for initial-ranging only. The mini-slot allocation field of the MAP M3 informs every terminal 2-1~2-n of the initial-ranging data transmission opportunities so that every terminal 2-1~2-n can transmit initial-ranging packet toward mini-slots S30, S31, S32, S33, and S34 in response to the MAP M3 as shown min FIG. 12.

Figure 10:
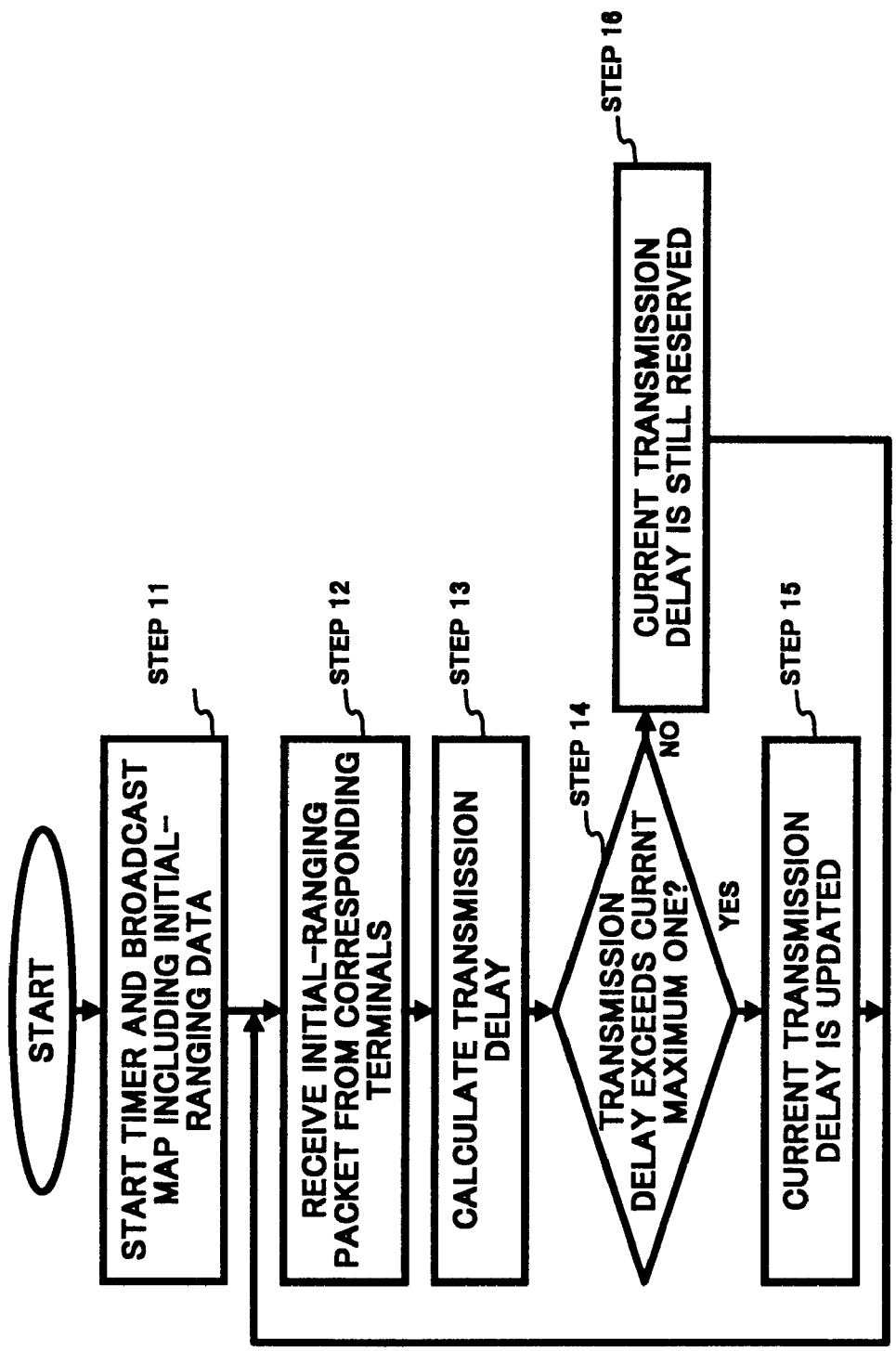
FIG. 10 is a flowchart illustrating a procedure for an initial ranging operation in the central control unit of FIG. 1.
Figure 13:
FIG. 13 shows an example of a frame structure of a initial-ranging packet used in a data communications system according to the present invention.

On receiving the data to be set into the MAP M3 from the data processing unit 10, the MAC 11 commands the transmission delay measurer 15 to start the timer and broadcasts the MAP M3 to every terminal 2-1~2-n (see STEP 11 of FIG. 10).

At time T22, the terminal C receives the MAP M3 and scans it for initial-ranging packet transmission opportunities. Similarly, at time T23, the terminal D receives the MAP M3 and scans it for initial-ranging packet transmission opportunities. Consequently, both terminals recognize that the mini-slots S30, S31, S32, S33, and S34 accept initial-ranging packets.

At time T24, the terminal C sends an initial-ranging packet P1 toward a mini-slot S31. Time T24 is chosen based on a ranging offset indigenous to the terminal C so that the initial-ranging packet P1 will arrive at the central control unit 1 at T26. Similarly, at time T25, the terminal D sends an initial-ranging packet P2 toward a mini-slot S33. Time T25 is chosen based on a ranging offset indigenous to the terminal D so that the initial-ranging packet P2 will arrive at the central control unit 1 at T27.

As shown in FIG. 12, an initial-ranging packet comprises three parts: a preamble composed of unique words for identifying the request packet, a header informing the central control unit 1 of the packet class of the initial-ranging packet, and a terminal ID informing the central control unit 1 of the sender of the initial-ranging packet.

The transmission delay measurer 15 detects an arrival of an initial ranging packet from corresponding terminals, if the transmission delay measurer 15 judges that a preamble of the packet controls unique words for initial-ranging composed of predetermined line of bits and that a signal level of the packet received via the upstream channel exceeds a predetermined value of the carrier level (see STEP 12 of FIG. 10).

There are several ways of setting up the predetermined value of the carrier level as follows.

(1) Immediately after the system is switched on or reset, the MAC 11 detects a noise level of the communication channel itself via the demodulator 13 because no terminal transmits any signals at this time.

(2) The MAC broadcasts a MAP which includes a mini-slot allocation field indicating that a fictional terminal can send a packet toward a mini-slot. Consequently, the MAC 11 can detect a noise level of the communication channel by investigating the noise level of that mini-slot.

(3) A plurality of serial mini-slots to which every terminal 2-1~2-n can send some packets are not always filled with packets. The MAC 11 checks the noise level of all mini-slots. The MAC 11 can then detect the noise level of the communication channel by determining the lowest noise level of the checked noise levels as the noise level of the communication channel.

After one or more of these operations (1), (2), or (3), the MAC 11 forwards the detected noise level. The transmission delay measurer 15 regards the noise level itself or a value including some margin added to the noise level as the predetermined value of carrier level and stores it.

On detecting the arrival of the initial-ranging packet, the transmission delay measurer 15 calculates the transmission delay of the initial-ranging packet using a corresponding value counted by the timer (see STEP 13 of FIG. 10) and forwards the calculated transmission delay to the MAC 11.

The MAC 11 stores the first received transmission delay in the memory 16 as a provisional current maximum transmission delay. After that, on receiving a transmission delay from the demodulator 13, the MAC 11 compares the newly received transmission delay and the current maximum transmission delay stored in the memory 16 (see STEP 14 of FIG. 10).

If the newly received transmission delay exceeds the current maximum transmission delay (see STEP 15 of FIG. 10), the current transmission delay is rewritten. If the newly received transmission delay does not exceed the current maximum transmission delay (see STEP 16 of FIG. 10), the current transmission delay is still preserved. In either case, after a comparison, the MAC 11 waits for further receptions of the initial-ranging packets. This procedure is continued for a current latency.

In the initial ranging operation, every terminal adjusts its time to avoid a data collision caused by sending a packet toward a middle of two mini-slots.

Furthermore, after the initial ranging operation, the same procedures are operated at predetermined intervals (hereinafter, referred to as "periodical ranging") so as to grasp the current transmission delay.

The central control unit 1 suitably changes the latency using the current maximum transmission delay which is obtained as described above.

Figure 14:
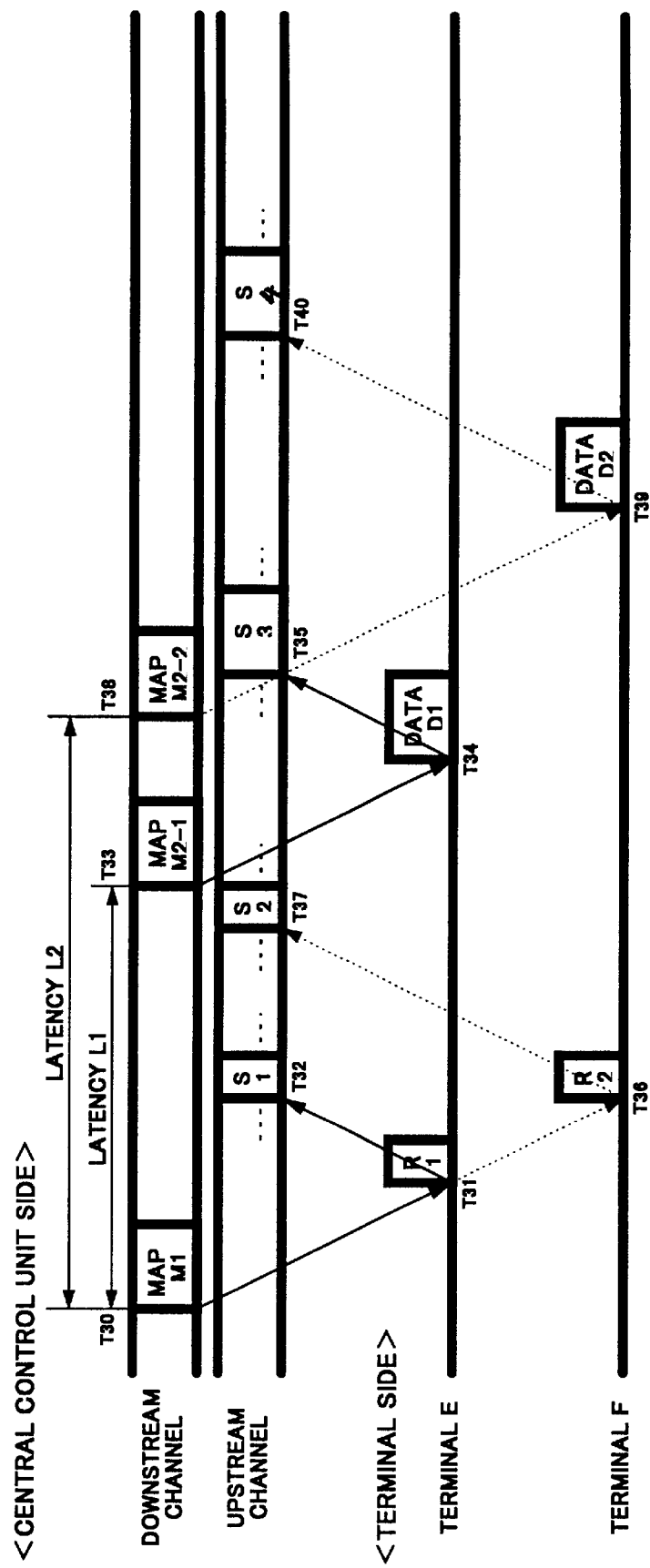
FIG. 14 is a timing chart illustrating a procedure for data transmission between a central control unit and terminals in a data communications system according to the present invention.

FIG. 14 is a timing chart illustrating a procedure for data transmission between a central control unit and terminals in a data communications system according to the present invention. In FIG. 14, the processing time of each terminal, which is a component of a transmission delay, is neglected for convenience' sake.

Assuming that the most theoretically distant terminal is a terminal E in disregard of the terminal B which is not in operation, at time T30, the central control unit 1 broadcasts a MAP M1. At time T31, the terminal E receives the MAP M1 and sends a request packet R1 toward a mini-slot S1 (T32) in response to the MAP M1. After a latency L1 which is determined in consideration of the current maximum transmission delay caused by the terminal E, namely, at time T33, the central control unit 1 broadcasts a MAP M2-1. At time T34, the terminal E receives the MAP M2-1 and sends a data packet D1 toward a mini-slot S3 (T35). The difference between T31 and T34 is approximately equal to the latency L1.

On the other hand, assuming that the most theoretically distant terminal is F, at time T36, the terminal F receives the MAP M1 and sends a request packet R2 toward a mini-slot S2 (T37) in response to the MAP M1. After a latency L2 (L1<L2) which is determined in consideration of the current maximum transmission delay caused by the terminal F, namely, at time T38, the central control unit 1 broadcasts a MAP M2-2. At time T39, the terminal F receives the MAP M2-2 and sends a data packet D2 toward a mini-slot S4 (T40). The difference between T36 and T39 is approximately equal to the latency L2.

Consequently, even if a new terminal is added to the system or an existing terminal is removed from the system, the central control unit 1 can suitably broadcast a MAP toward the terminals 2-1~2-n using the latency which is dynamically updated.

Numerous modifications and variations of the present invention are possible in light of the above teachings. It is therefor to be understood that, within the appended claims, the present invention can be practiced in a manner other than as specifically described herein.

What is claimed is:

1. A data communications system, comprising
    a central control unit; a plurality of terminals; and
    a communication channel having an upstream channel and a downstream channel, the communication channel connecting the central control unit and the terminals, the upstream channel being time-shared among the terminals and a time shared channel being assigned to a terminal that requests a time-shared channel;
    wherein the central control unit comprises:
        means for measuring a transmission delay between the central control unit and each terminal via the communication channel;
        means for selecting the maximum transmission delay from the measured transmission delays;
        means for updating the maximum transmission delay at predetermined intervals after the selecting the maximum transmission delay; and
        means for controlling the timing of data transmission of the central control unit according to the maximum transmission delay.

2. A data communications system, comprising:
    a central control unit;
    a plurality of terminals; and
    a communication channel having an upstream channel and a downstream channel, the communication channel connecting the central control unit and the terminals, the upstream channel being time-shared among the terminals and a time-shared channel being assigned to a terminal that requests a time-shared channel;
    wherein the central control unit comprises:
        means for sending a first packet to at least one of the terminals;
        means for detecting an arrival of a second packet sent by the one terminal in response to the first packet;
        means for measuring a round-trip time from the sending to the detecting;
        means for selecting the longest round-trip time among a plurality of measured round-trip times;
        means for updating the longest round-trip time at predetermined intervals after the selecting the longest round-trip time; and
        means for controlling the timing of data transmission of the central control unit according to the longest round-trip time.

3. The data communications system of claim 2, wherein the central control unit further comprises:
    means for sending a third packet informing the terminal of an assignment information on the time-shared channel.

4. The data communications system of claim 3, wherein:
    the controlling means decides a time interval between sending the first packet and sending the third packet according to the longest time.

5. The data communications system of claim 2, wherein:
    the sending means broadcasts the first packet which instructs the terminal to send a second packet to the central control unit.

6. The data communications system of claim 5, wherein:
    the sending means broadcasts the first packet when the system is switched on or reset.

7. The data communications system of claim 5, wherein:
    the sending means broadcasts the first packet when the number of the terminals in operation changes.

8. The data communications system of claim 5, wherein:
    the sending means broadcasts the first packet at predetermined intervals.

9. The data communications system of claim 2, wherein the determining means includes:
    a memory storing the longest round-trip time; and
    wherein the determining means determines the longest round-trip time by comparing a newly measured round-trip time and the current longest round-trip time stored in the memory.

10. A method for controlling a data communications system having a central control unit, a plurality of terminals, and a communication channel having an upstream channel and a downstream channel, the communication channel connecting the central control unit and the terminals, the upstream channel being time-shared among the terminals and a time-shared channel being assigned to a terminal that requests a time-shared channel comprising the steps of:
    assigning a time-shared channel to a terminal that requests a time-shared channel;
    sending a first packet to one of the terminals;
    detecting an arrival of a second packet sent by the one terminal in response to the first packet; measuring a round-trip time from the sending to the detecting;
    selecting the longest round-trip time among a plurality of measured round-trip times;
    updating the longest round-trip time at predetermined intervals after the selecting the longest round-trip time; and
    controlling the timing of data transmission of the central control unit according to the longest round-trip time.

11. The method for controlling a data communications system of claim 10, further comprises the step of:
    sending a third packet informing the terminal of an assignment information on the time-shared channel.

12. The method for controlling a data communications system of claim 11, further comprises the step of:
    deciding a time interval between sending the first packet and sending the third packet according to the longest time.

13. The method for controlling a data communications system of claim 10, wherein the first packet sending step includes the step of:
    broadcasting the first packet which instructs the terminal to send a second packet to the central control unit.

14. The method for controlling a data communications system of claim 13, wherein:
    the broadcasting step is executed when the system is switched on or reset.

15. The method for controlling a data communications system of claim 13, wherein:
    the broadcasting step operates when the number of the terminals in operation changes.

16. The method for controlling a data communications system of claim 13, wherein:

the broadcasting step is executed at predetermined intervals.

17. The method for controlling a data communications system of claim 10, further comprises the step of:

storing the longest round-trip time in a memory;

wherein the determining step includes the step of comparing a newly measured round-trip time and the current longest round-trip time stored in the memory.

* * * * *